(12) United States Patent
Ogden

(10) Patent No.: US 7,539,789 B1
(45) Date of Patent: May 26, 2009

(54) CIRCUITS PROVIDING GREATER DEPTH AND/OR ASYMMETRIC ACCESS PORTS FOR FIRST-IN FIRST-OUT MEMORY CIRCUITS (FIFOS)

(75) Inventor: James E. Ogden, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 124 days.

(21) Appl. No.: 11/503,889

(22) Filed: Aug. 14, 2006

(51) Int. Cl.
G06F 3/00 (2006.01)
G06F 13/00 (2006.01)

(52) U.S. Cl. .............................. 710/36; 710/38; 710/52; 365/189.011; 365/211

(58) Field of Classification Search ........................ None
See application file for complete search history.

(56) References Cited

U.S. PATENT DOCUMENTS

| | | | |
|---|---|---|---|
| 5,615,355 | A | 3/1997 | Wagner |
| 5,956,492 | A | 9/1999 | Jander et al. |
| 6,191,992 | B1 | 2/2001 | Komoto |
| 6,208,703 | B1 | 3/2001 | Cavanna et al. |
| 6,400,642 | B1 | 6/2002 | Mehrotra et al. |
| 6,434,642 | B1 | 8/2002 | Camilleri et al. |
| 7,106,098 | B1 | 9/2006 | Zack et al. |
| 7,191,162 | B2 | 3/2007 | Gibbs et al. |
| 7,209,983 | B2 | 4/2007 | Au et al. |
| 7,227,380 | B2 | 6/2007 | Elftmann et al. |
| 2002/0075980 | A1* | 6/2002 | Tang et al. .................. 375/372 |
| 2002/0080672 | A1* | 6/2002 | Lee et al. ..................... 365/221 |
| 2002/0138674 | A1* | 9/2002 | Mann .......................... 710/52 |

OTHER PUBLICATIONS

Xilinx, Inc.; "Virtex-4 User Guide"; UG070 (v1.5); Chapter 4; Mar. 21, 2006; available from www.xilinx.com; pp. 109-161.
Lois Cartier; "Implementing FIFOs in XC4000 Series RAM"; XAPP 053; (Version 1.1); Jul. 7, 1996; available from www.xilinx.com; pp. 1-16.
Peter Alfke; "Synchronous and Asynchronous FIFO Designs"; XAPP 051; (Version 2.0); Sep. 17, 1996; available from www.xilinx.com; pp. 1-12.
Xilinx, Inc.; "170 MHz FIFOs Using the Virtex Block SelectRAM+ Feature"; XAPP 131; (Version 1.7); Mar. 26, 2003; available from www.xilinx.com; pp. 1-7.
Xilinx, Inc.; "High Speed FIFOs in Spartan-II FPGAs"; XAPP 175; (Version 1.0); Nov. 23, 1999; available from www.xilinx.com; pp. 1-6.

(Continued)

*Primary Examiner*—Ilwoo Park
*Assistant Examiner*—Scott Sun
(74) *Attorney, Agent, or Firm*—Lois D. Cartier; LeRoy D. Maunu

(57) ABSTRACT

Memory circuits that concatenate multiple FIFOs in parallel to increase the overall depth of the memory circuits. Asymmetric input and output ports can be provided by including a deserializer on the write interface of the memory circuit and/or a serializer on the read interface of the memory circuit. The deserializer disperses the data evenly across all FIFOs, minimizing the write-to-read latency. In some embodiments, at most two of the FIFOs are active at any given time, one being written and one being read, which reduces the overall power consumption of the memory circuit compared to known structures.

16 Claims, 10 Drawing Sheets

OTHER PUBLICATIONS

Nick Camilleri; "Data-Width Conversion FIFOs Using the Virtex Block SelectRAM Memory"; XAPP 205; (Version 1.3); Aug. 10, 2000; available from www.xilinx.com; pp. 1-6.

Xilinx, Inc.; "FIFOs Using Virtex-II Block RAM"; XAPP 258; (Version 1.4); Jan. 7, 2005; available from www.xilinx.com; pp. 1-6.

Nick Camilleri; "Data-Width Conversion FIFOs Using the Virtex Block RAM Memory"; XAPP 261; (Version 1.0); Jan. 10, 2001; available from www.xilinx.com; pp. 1-6.

Marc Defossez, Nick Sawyer; "Using Block SelectRAM Memories as Serializers or Deserializers"; XAPP 690; (Version 1.0); Oct. 6, 2003; available from www.xilinx.com; pp. 1-13.

Wen Ying Wei, Dai Huang; "Parameterizable LocalLink FIFO"; XAPP 691; (Version 1.0); Feb. 2, 2004; available from www.xilinx.com; pp. 1-30.

Xilinx, Inc.; "FIFO Generator v2.0"; Product Specification; Nov. 11, 2004; available from www.xilinx.com; pp. 5-61.

Xilinx, Inc.; "FIFO Generator v1.0"; Product Specification; DS478; Apr. 23, 2004; available from www.xilinx.com; pp. 1-45.

Xilinx, Inc.; "FIFO Generator v1.1"; Product Specification; DS296; May 21, 2004; available from www.xilinx.com; pp. 1-51.

Xilinx, Inc.; "Answer Record # 22462: Virtex-4—Why are the FIFO16 flags not working correctly?"; last modified May 8, 2006; downloaded Jul. 6, 2006 from http://www.xilinx.com/xlnx/xil_ans_display.jsp? iLanguage ID=1&iCountryID=&getPageP...; pp. 1-6.

Xilinx, Inc.; "Aynchronous FIFO v5.0"; Product Specification; DS232(v0.1); Nov. 1, 2002; available from www.xilinx.com; pp. 1-9.

Xilinx, Inc.; "Aynchronous FIFO v5.1"; Product Specification; DS232(v0.2); Mar. 28, 2003; available from ww.xilin.com; pp. 1-9.

Xilinx, Inc.; "Aynchronous FIFO v6.0"; Product Specification; DS232; Nov. 11, 2004; available from www.xilinx.com; pp. 1-12.

Xilinx, Inc.; "Aynchronous FIFO v6.1"; Product Specification; DS232; Nov. 11, 2004; available from www.xilinx.com; pp. 1-12.

Xilinx, Inc.; "Synchronous FIFO v4.0"; Product Specification; DS256(v1.0); Mar. 28, 2003; available from ww.xilinx.com; pp. 1-6.

Xilinx, Inc.; "Synchronous FIFO v5.0"; Product Specification; DS256; May 21, 2004; available from ww.xilinx.com; pp. 1-10.

Paul Gigliotti; "Serial-to-Parallel Converter"; XAPP 194; (Version 1.0); Jul. 20, 2004; available from www.xilinx.com; pp. 1-6.

* cited by examiner

CIRCUITS PROVIDING GREATER DEPTH AND/OR ASYMMETRIC ACCESS PORTS FOR FIRST-IN FIRST-OUT MEMORY CIRCUITS (FIFOS)

FIELD OF THE INVENTION

The invention relates to first-in first-out memory circuits (FIFOs). More particularly, the invention relates to FIFO structures providing increased depth and/or asymmetric read/write access.

BACKGROUND OF THE INVENTION

FIFOs are often used in systems to store data on a temporary basis. For example, data may be received from a system bus at a faster rate than the data can be properly handled by the destination circuitry. To avoid any problems that might be caused by this difference in data rates, the receiver circuit can store the data in a FIFO at a first clock rate (e.g., a write clock rate compatible with the system bus), and retrieve the data at a second clock rate (e.g., a read clock rate compatible with the destination circuitry).

A FIFO can have a maximum width and a maximum depth. For example, a FIFO might have a maximum width of 36 bits and a maximum depth of 4 k (4098) words. To increase the width of a memory circuit (e.g., the number of bits in a word) by using multiple FIFOs is relatively straightforward. For example, to store values of up to 72 bits, two FIFOs with a maximum width of 36 bits can be used, with the more significant 36 bits being stored in the first FIFO, and the less significant 36 bits being stored in the second FIFO.

FIG. 1 shows one known method of concatenating FIFOs to increase the overall depth of the memory circuit (e.g., the number of words that can be stored in the memory circuit). In the memory circuit of FIG. 1, four FIFOs 101-104 are concatenated in series. The same method can also be applied to fewer or more than four FIFOs. A first FIFO 101 has an input port coupled to a write interface 111 of the memory circuit. The last FIFO 104 in the series has an output port coupled to a read interface 112 of the memory circuit. In the pictured memory circuit, the first two FIFOs 101, 102 are operated in the write clock domain (e.g., using write clock signal WR_CLK), and the last FIFO 104 is operated in the read clock domain (e.g., using read clock signal RD_CLK). As shown by dotted line 121, the third FIFO 103 in the series is operated partially in the write clock domain and partially in the read clock domain, with write cycles being controlled by signal WR_CLK and read cycles being controlled by signal RD_CLK. Note that the transition between clock domains can occur in any of the four FIFOs. The location for the transition is typically determined based on the relative clock rates of the write and read clocks. It is generally desirable to operate most of the FIFOs in the faster of the two clock domains, to avoid bottlenecks in writing and reading data.

The memory circuit of FIG. 1 has some disadvantages. For example, the write-to-read latency (the number of clock cycles required for a word written to an empty memory circuit to be available for reading) can be unacceptably long for some applications. For highly parameterizable applications, e.g., where the number of FIFOs being concatenated can vary, the write-to-read latency may also vary, which can be undesirable. Further, when there is a significant difference in frequency between the write clock and the read clock, data bottlenecks can occur, which can cause unpredictable status flag behavior. Therefore, the memory circuit of FIG. 1 might not be suitable for some applications in which the write and read clocks are asynchronous and/or the clock frequencies are not stable or are not well-characterized.

Therefore, it is desirable to provide memory circuits that are more suitable for asynchronous applications than the memory circuit illustrated in FIG. 1.

SUMMARY OF THE INVENTION

The invention provides memory circuits that concatenate multiple FIFOs in parallel to increase the overall depth of the memory circuits. Asymmetric input and output ports can be provided by including a deserializer on the write interface of the memory circuit and/or a serializer on the read interface of the memory circuit. The deserializer disperses the data evenly across all FIFOs, minimizing the write-to-read latency. In some embodiments, at most two of the FIFOs are active at any given time, one being written and one being read, which reduces the overall power consumption of the memory circuit.

BRIEF DESCRIPTION OF THE DRAWINGS

The present invention is illustrated by way of example, and not by way of limitation, in the following figures.

DETAILED DESCRIPTION OF THE DRAWINGS

The present invention is applicable to a variety of integrated circuits (ICs) and systems. The present invention has been found to be particularly applicable and beneficial for programmable logic devices (PLDs). An appreciation of the present invention is presented by way of specific examples utilizing PLDs such as field programmable gate arrays (FPGAs). However, the present invention is not limited by these examples. For example, the memory circuits of the invention can be implemented in ICs that are non-programmable or only partially programmable. The memory circuits of the invention can also be implemented using discrete devices, for example.

Further, in the following description, numerous specific details are set forth to provide a more thorough understanding of the present invention. However, it will be apparent to one skilled in the art that the present invention can be practiced without these specific details.

Figure 2:
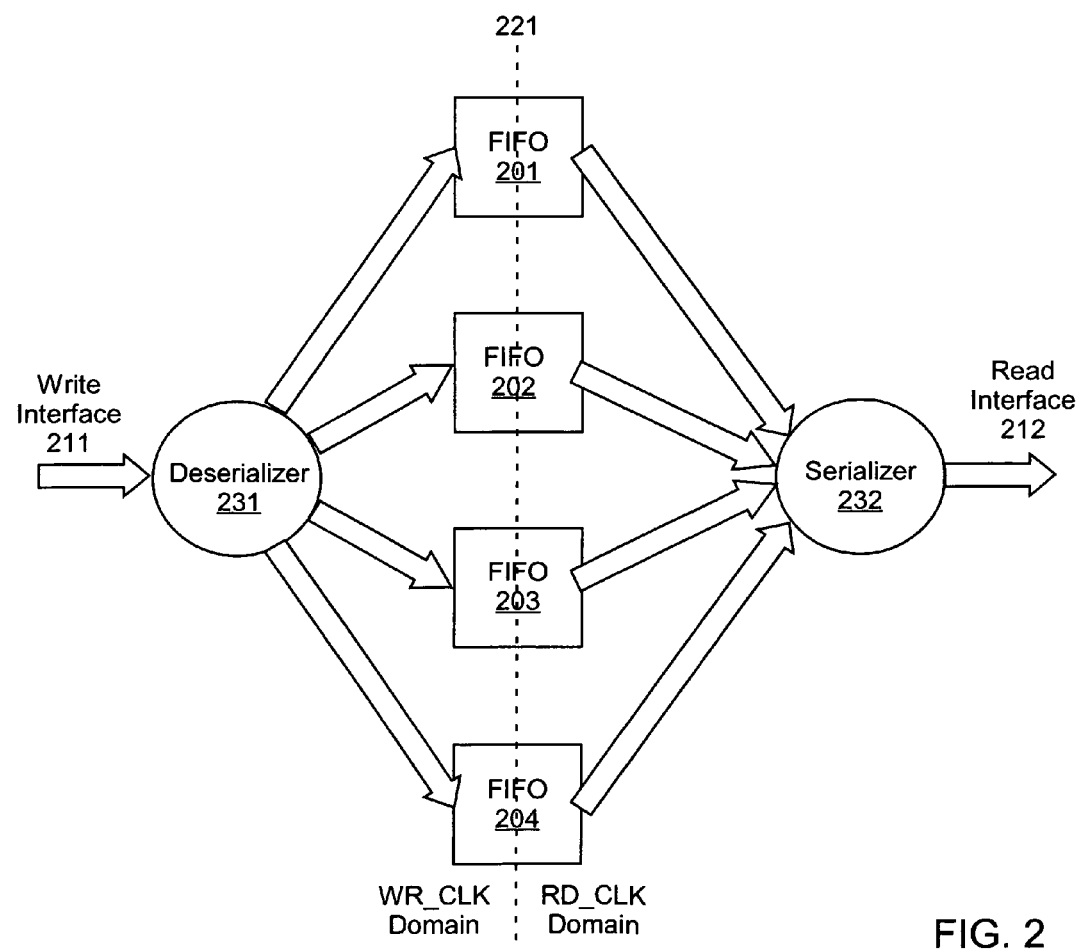
FIG. 2 is a high-level diagram of a novel approach to concatenating FIFOs to increase the overall depth of a memory circuit.

FIG. 2 is a high-level diagram illustrating a novel approach to concatenating FIFOs to increase the overall depth of the memory circuit (e.g., the number of words that can be stored in the memory circuit). In the memory circuit of FIG. 2, four FIFOs 201-204 are concatenated in parallel. As will be clear to those of skill in the relevant arts with respect to all exemplary embodiments, the same method can also be applied to fewer or more than four FIFOs. A write interface 211 provides access to a deserializer 231, which deserializes the input data and stores the input data in four FIFOs 201-204. For example, a first word received on write interface 211 can be stored in FIFO 201, a second word is stored in FIFO 202, a third word is stored in FIFO 203, a fourth word is stored in FIFO 204, and the cycle repeats, e.g., by storing a fifth word in FIFO 201.

On the read side, the same pattern is followed. Under the control of serializer 232, the first read cycle retrieves a word from FIFO 201, the second read cycle retrieves a word from FIFO 202, and so forth. Therefore, the data is read in the same order in which the data is stored in the memory circuit.

As shown by dotted line 221, FIFOs 201-204 each operate in both the write clock and read clock domains, with write operations being performed in the write clock (WR_CLK) domain and read operations being performed in the read clock (RD_CLK) domain. There is no data bottleneck due to a misplacement of the transition between clock domains, as can occur, for example, in the memory circuit of FIG. 1. Therefore, the memory circuit of FIG. 2 is suitable for applications in which the frequencies of the write and read clocks are highly asynchronous, e.g., the two clocks differ widely in frequency.

Figure 1:
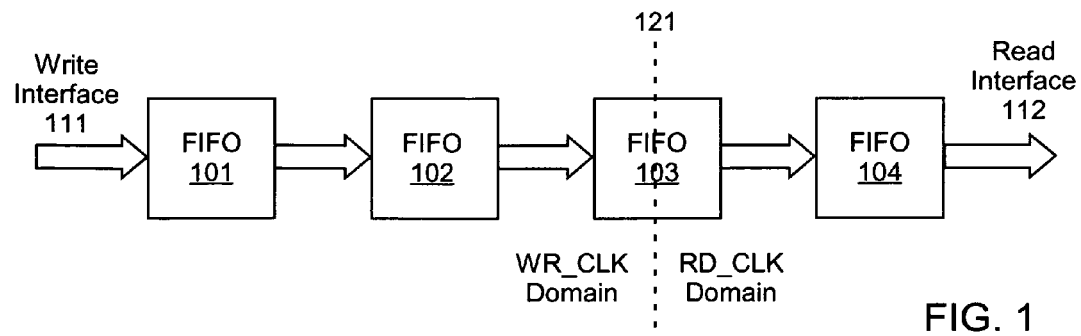
FIG. 1 is a high-level diagram of a conventional approach to concatenating FIFOs to increase the overall depth of a memory circuit.

The memory circuit of FIG. 2 has an additional advantage over the circuit of FIG. 1 in that the write-to-read latency is significantly reduced, particularly for large memory circuits that include a large number of FIFOs. Further, when the deserializer and serializer are implemented in a consistent fashion, the latency does not vary with the size of the memory circuit. Therefore, the write-to-read latency is predictable.

In some embodiments, at most two of the FIFOs in the memory circuit are active at any given time: the FIFO being written to, and the FIFO being read. In these embodiments, the power consumption of the circuit can be significantly reduced from that of the memory circuit of FIG. 1, in which all FIFOs are active during each write cycle and each read cycle.

Another advantage of the memory circuit of FIG. 2 is that certain status signals are easier to generate. Since the circuit of FIG. 2 shares data equally between the different FIFOs, the status of the memory circuit as a whole can be interpolated from the status of any of the FIFOs. Therefore, the FULL and EMPTY flags of any of the FIFOs can be used to provide a FULL or EMPTY status signal for the memory circuit. Therefore, FULL and EMPTY signals are simple to generate, as they are in prior art FIFOs. A more accurate and only slightly more complicated implementation of the FULL and EMPTY status signals is shown and described in connection with FIGS. 10-12, below.

However, data count signals are much easier to generate than when prior art circuits are used. A data count output from any of the FIFOs can be used to generate a data count output for the memory circuit as a whole. When this straightforward implementation is used, however, the data count is rounded off, and does not provide completely precise information on the status of the memory circuit as a whole.

Figure 3:
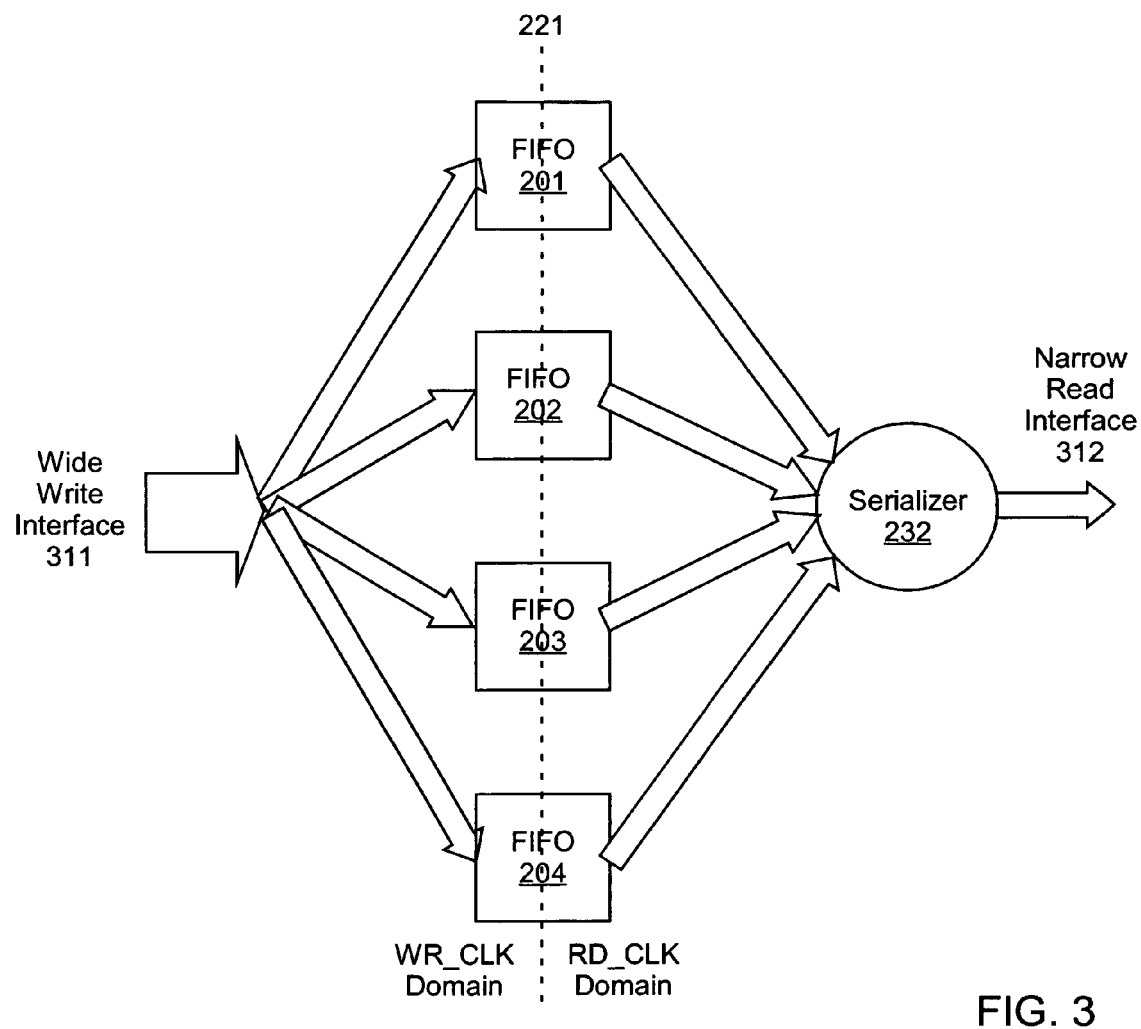
FIG. 3 is a high-level diagram of a novel approach to concatenating FIFOs where the overall memory circuit has a relatively wide write interface and a relatively narrow read interface.

Structures similar to that of FIG. 2 can be used to implement asymmetric memory circuits, i.e., memory circuits in which the read and write ports are of different widths. For example, FIG. 3 illustrates a memory circuit in which the write interface 311 is wider than the read interface 312. The write interface writes simultaneously to each FIFO, while the read interface reads data from one FIFO at a time. When the memory circuit includes four FIFOs 201-204 as shown in FIG. 3, and the read interface 312 is N bits wide, the write interface 311 is 4N bits in width. No deserializer is needed, because the write interface is the same width as the four FIFOs. A serializer 232 is used to serialize the 4N bits from the four FIFOs and provide the N-bit read data to the read interface.

Figure 4:
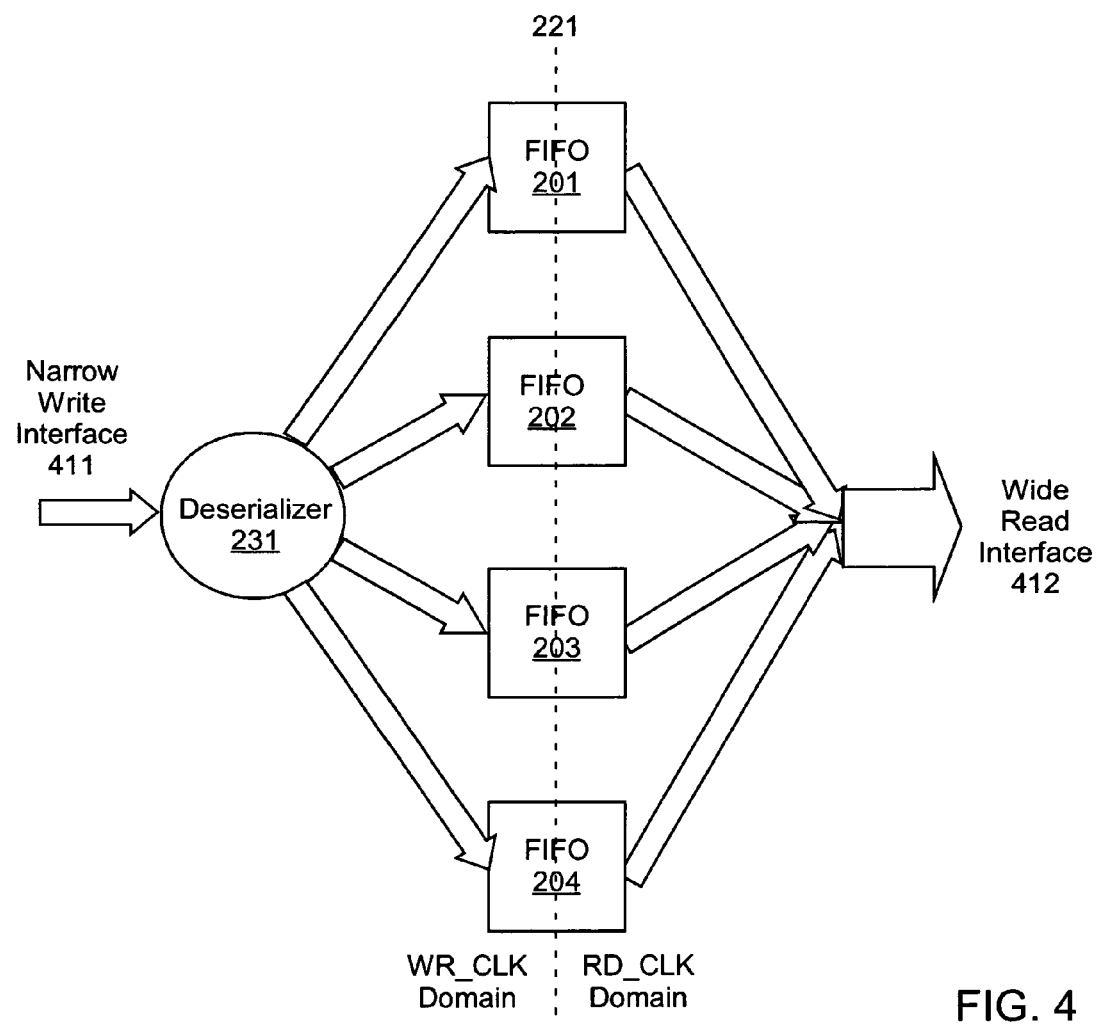
FIG. 4 is a high-level diagram of a novel approach to concatenating FIFOs where the overall memory circuit has a relatively narrow write interface and a relatively wide read interface.

FIG. 4 illustrates a memory circuit in which the write interface 411 is narrower than the read interface 412. The write interface writes to one FIFO at a time, while the read interface reads simultaneously from all of the FIFOs. When the memory circuit includes four FIFOs 201-204 as shown in FIG. 4, and the write interface 411 is N bits wide, the read interface 412 is 4N bits in width. No serializer is needed, because the read interface is the same width as the four FIFOs. A deserializer 231 is used to deserialize the N bits from the write interface, providing N bits of write data to each of the four FIFOs in turn.

One situation in which the memory circuits of FIGS. 2-4 are especially useful is when many FIFOs of fixed maximum depth are available and different numbers of these FIFOs can be concatenated in any of several different ways. When many different options are available, predictable write-to-read latency and compatibility with unpredictable and/or asymmetrical write and read clock signals are of particular value. One such application for the memory circuits of the invention is in programmable logic devices (PLDs) that include memory blocks programmable to operate as FIFOs.

PLDs are a well-known type of integrated circuit that can be programmed to perform specified logic functions. One type of PLD, the field programmable gate array (FPGA), typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. PLDs can also be implemented as mask-programmable devices, or using fuse or anti-fuse technology, for example. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 5:
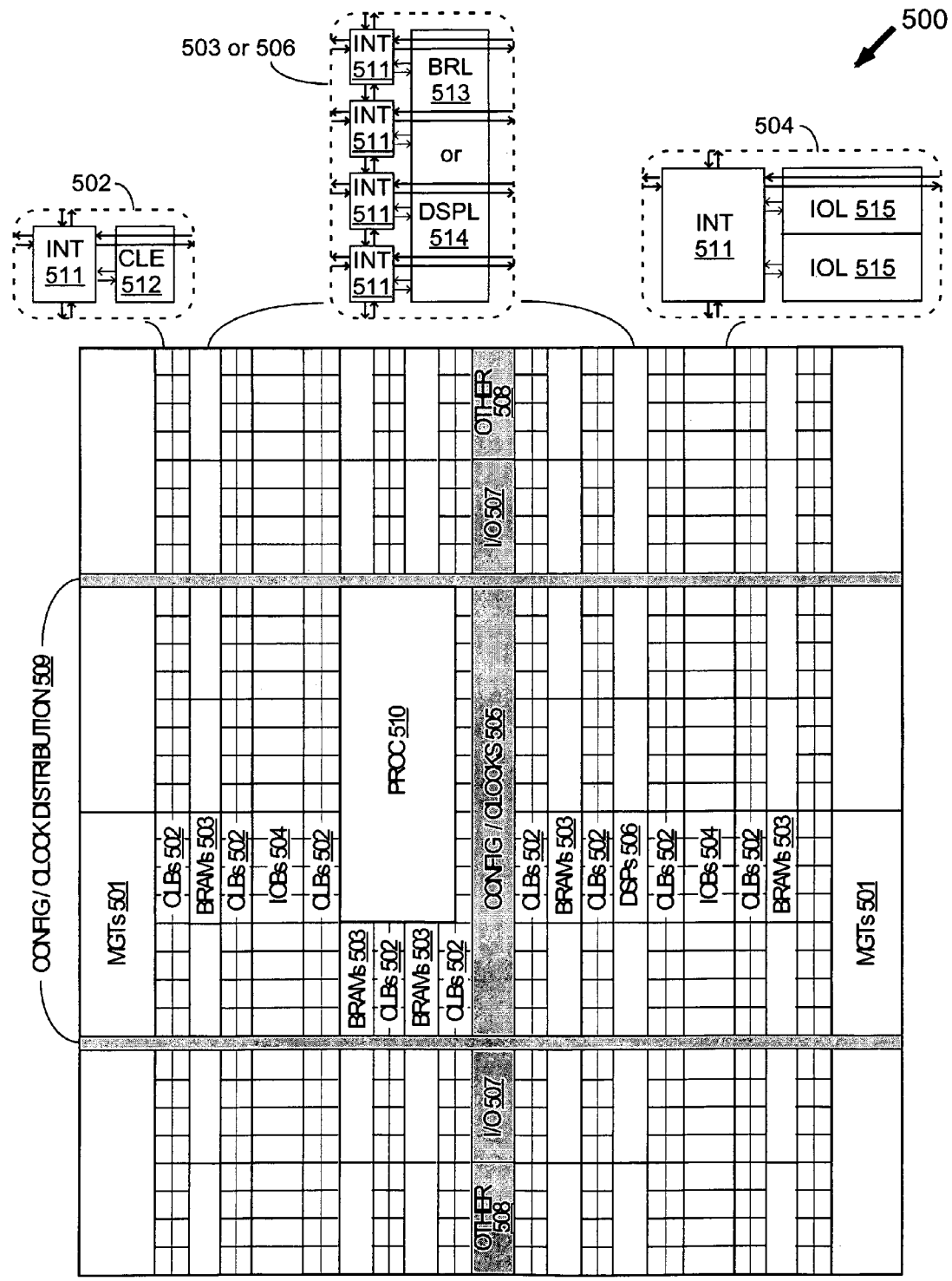
FIG. 5 is a block diagram of a known field programmable gate array (FPGA) that includes memory blocks that can be programmed to function as FIFOs.

As noted above, advanced FPGAs can include several different types of programmable logic blocks in the array. For example, FIG. 5 illustrates an FPGA architecture 500 that includes a large number of different programmable tiles including multi-gigabit transceivers (MGTs 501), configurable logic blocks (CLBs 502), random access memory blocks (BRAMs 503), input/output blocks (IOBs 504), configuration and clocking logic (CONFIG/CLOCKS 505), digital signal processing blocks (DSPs 506), specialized input/output blocks (I/O 507) (e.g., configuration ports and clock ports), and other programmable logic 508 such as digital clock managers, analog-to-digital converters, system monitoring logic, and so forth. Some FPGAs also include dedicated processor blocks (PROC 510).

In some FPGAs, each programmable tile includes a programmable interconnect element (INT 511) having standardized connections to and from a corresponding interconnect element in each adjacent tile. Therefore, the programmable interconnect elements taken together implement the programmable interconnect structure for the illustrated FPGA. The programmable interconnect element (INT 511) also includes the connections to and from the programmable logic element within the same tile, as shown by the examples included at the top of FIG. 5.

For example, a CLB 502 can include a configurable logic element (CLE 512) that can be programmed to implement user logic plus a single programmable interconnect element (INT 511). A BRAM 503 can include a BRAM logic element (BRL 513) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 506 can include a DSP logic element (DSPL 514) in addition to an appropriate number of programmable interconnect elements. An IOB 504 can include, for example, two instances of an input/output logic element (IOL 515) in addition to one instance of the programmable interconnect element (INT 511). As will be clear to those of skill in the art, the actual I/O pads connected, for example, to the I/O logic element 515 are manufactured using metal layered above the various illustrated logic blocks, and typically are not confined to the area of the input/output logic element 515.

In the pictured embodiment, a columnar area near the center of the die (shown shaded in FIG. 5) is used for configuration, clock, and other control logic. Horizontal areas 509 extending from this column are used to distribute the clocks and configuration signals across the breadth of the FPGA.

Some FPGAs utilizing the architecture illustrated in FIG. 5 include additional logic blocks that disrupt the regular columnar structure making up a large part of the FPGA. The additional logic blocks can be programmable blocks and/or dedicated logic. For example, the processor block PROC 510 shown in FIG. 5 spans several columns of CLBs and BRAMs.

Note that FIG. 5 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 5 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

The BRAM logic element (BRL 513) shown in FIG. 5 can be programmed to function as a FIFO, including addressing and status signal generation logic, and is suitable for the implementation of memory circuits such as those illustrated in FIGS. 2-4.

Figure 6:
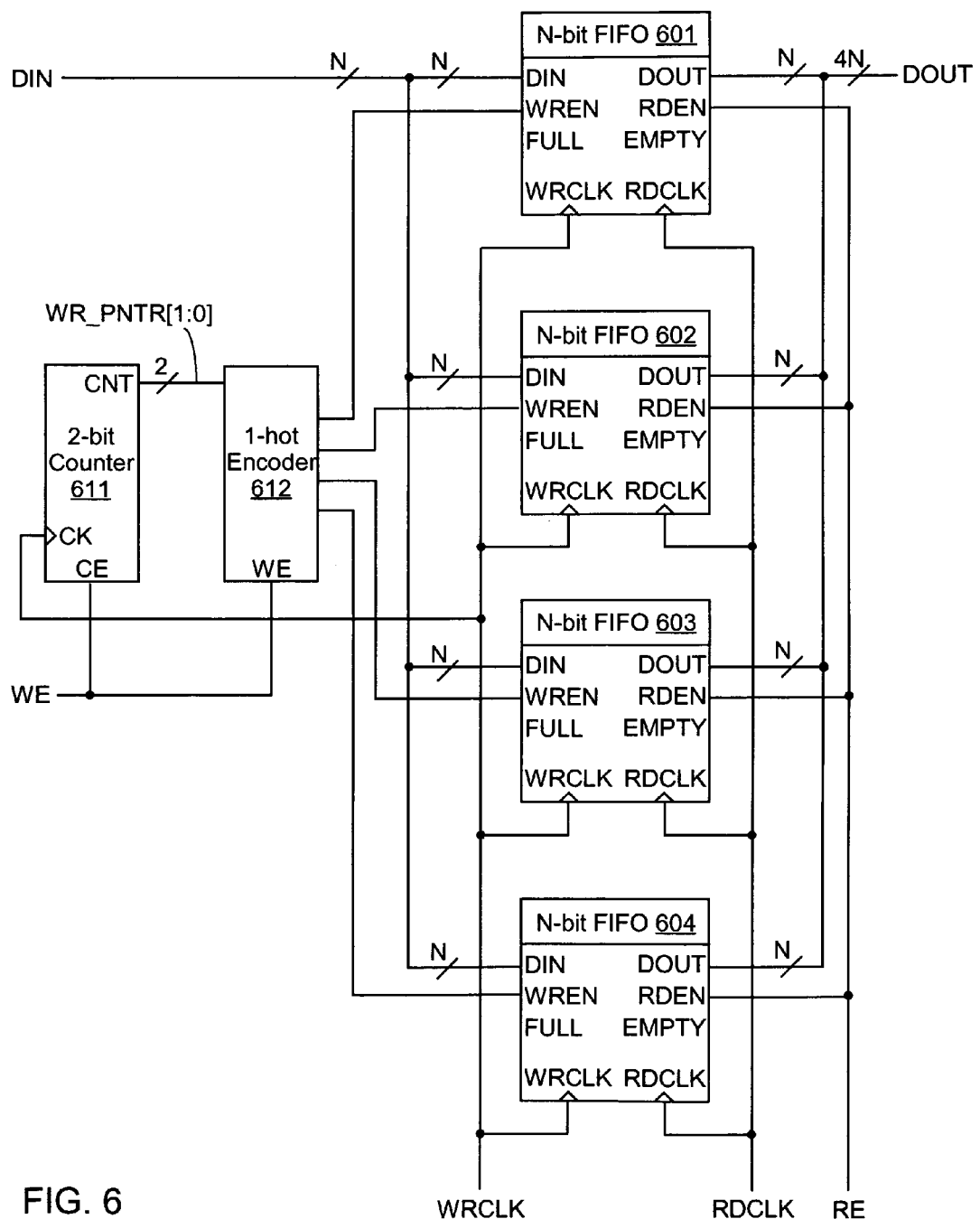
FIG. 6 illustrates a first memory circuit implementation suitable for interfacing between a relatively narrow write interface and a relatively wide read interface.

FIG. 6 illustrates one implementation of a memory circuit suitable for interfacing between a relatively narrow write interface and a relatively wide read interface, e.g., as shown in FIG. 4. The memory circuit of FIG. 6 can be implemented, for example, in the FPGA shown in FIG. 5, utilizing the BRAM logic elements to implement FIFOs 601-604. In the embodiment of FIG. 6, when write enable signal WE is high and write clock WRCLK goes high, a write operation occurs. (Note that in the present specification, the same reference characters are used to refer to terminals, signal lines, and their corresponding signals.) Each write of N-bit input data DIN to the memory circuit triggers a write of the input data DIN to a selected one of the FIFOs 601-604, as determined by a write pointer WR_PNTR[1:0] corresponding to the contents CNT of a 2-bit counter 611. The value CNT stored in counter 611 is interpreted by one-hot encoder 612 to enable a write operation for one of the FIFOs 601-604, the one FIFO for which the write enable signal WREN is high. Each write operation also increments the counter 611 (clock enable signal CE is high when clock signal CK goes high), so the value of CNT increases by one, and the next write will occur at the next FIFO in the sequence.

During a read operation, read clock signal RDCLK goes high when read enable signal RE is high. Signal RDEN goes high for each FIFO, so the values of all four FIFOs are provided as 4N-bit output data DOUT.

Status signals FULL and EMPTY can be used to generate status signals for the memory circuit (circuitry not shown in FIG. 6), e.g., by ORing together all of the FULL signals from the FIFOs to generate a FULL signal for the entire memory circuit, and/or ORing together all of the EMPTY signals from the FIFOs to generate an EMPTY signal for the entire memory circuit. When this straightforward implementation is used, however, the FULL and EMPTY status signals do not provide completely accurate information on the status of the memory circuit as a whole. A more accurate and only slightly more complicated implementation of the FULL and EMPTY status signals is shown in connection with FIGS. 10-12, below.

Figure 7:
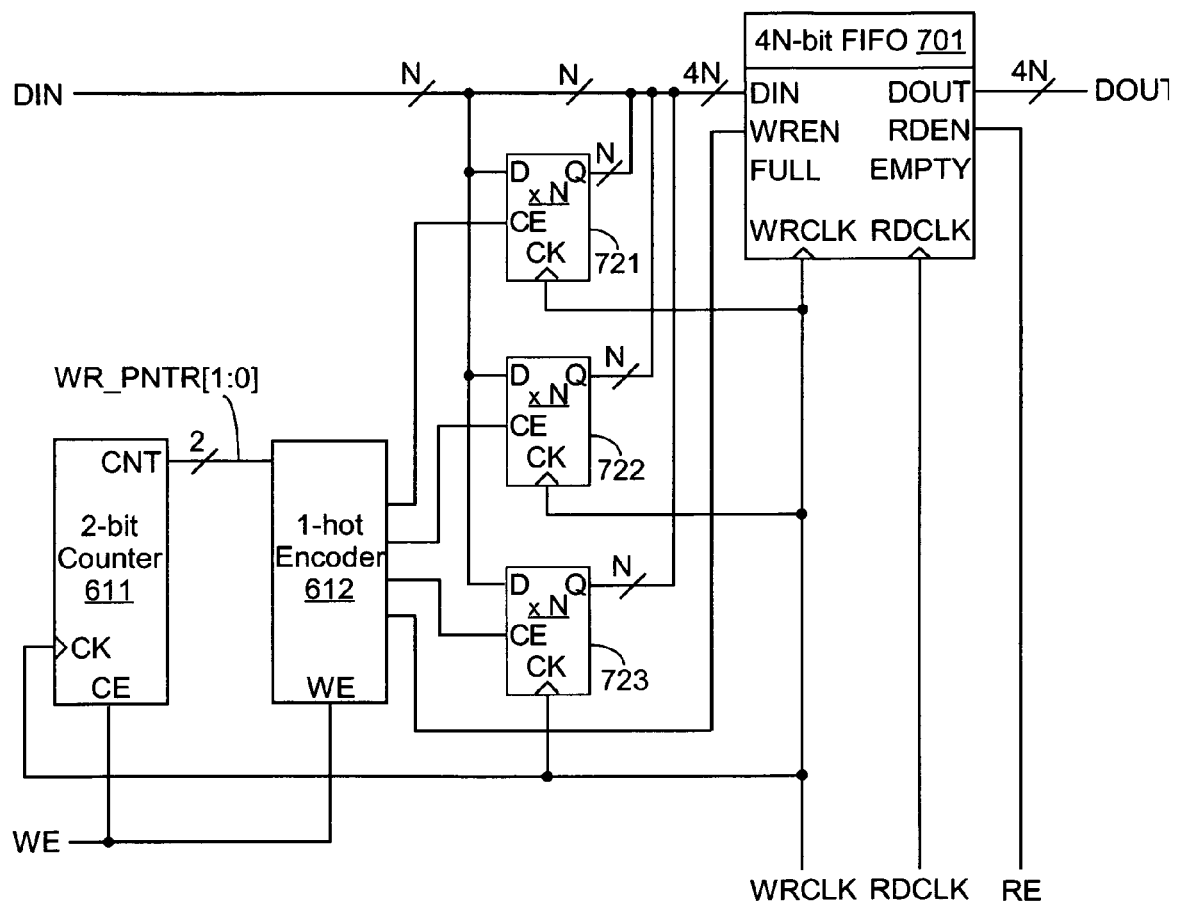
FIG. 7 illustrates a second memory circuit implementation suitable for interfacing between a relatively narrow write interface and a relatively wide read interface.

FIG. 7 illustrates the application of a similar technique to a single component FIFO to achieve asymmetric write and read ports. The memory circuit of FIG. 7 can be implemented, for example, in the FPGA shown in FIG. 5, utilizing a BRAM logic element to implement FIFO 701. In the embodiment of FIG. 6, each write clock cycle wrote a word to one of the FIFOs. In the embodiment of FIG. 7, the first three write clock cycles write a word to one of N-bit registers 721-723, and the fourth write clock cycle writes a fourth N-bit word to FIFO 701 along with the contents of registers 721-723. Thus, the input data DIN is deserialized. The control logic for the write interface is the same as the control logic in FIG. 6, except for the addition of registers 721-723. This consistency makes the design suitable for implementation in a parameterized FIFO design for PLDs, for example.

Figure 8:
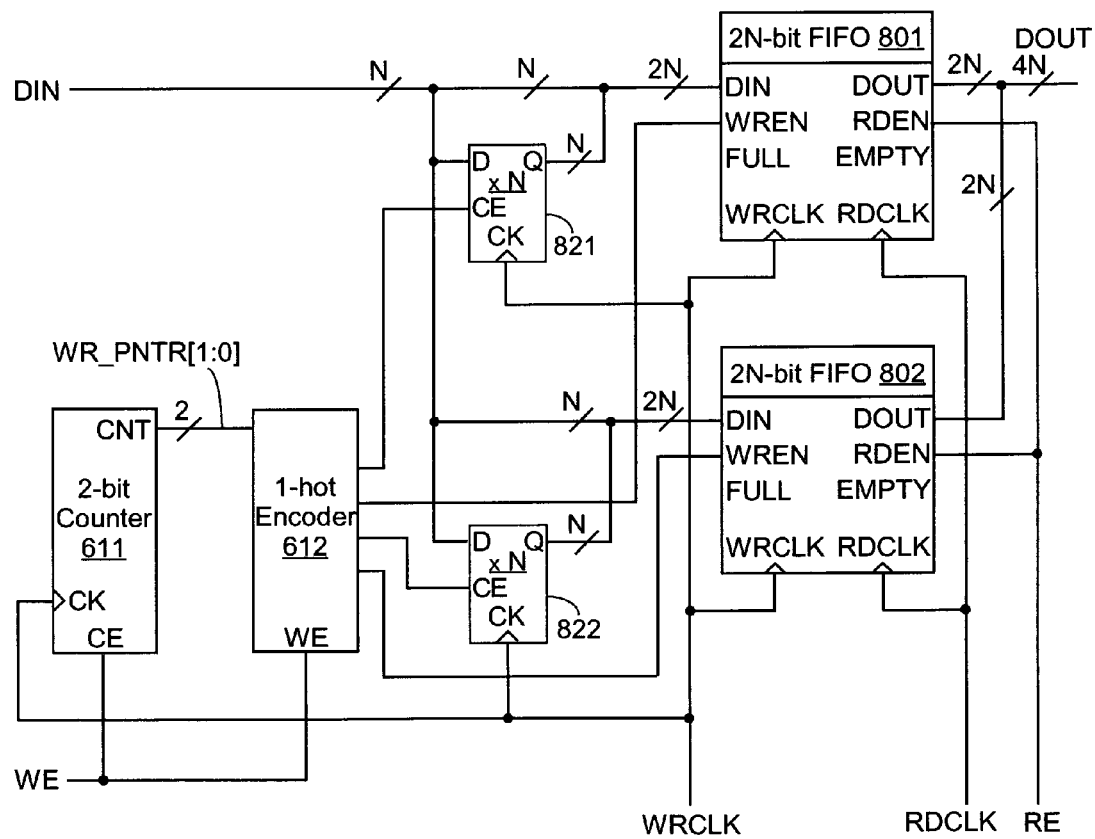
FIG. 8 illustrates a third memory circuit implementation suitable for interfacing between a relatively narrow write interface and a relatively wide read interface.

FIG. 8 illustrates one way in which a similar technique can be applied to a concatenation of two FIFOs, each of which is 2N bits wide. The memory circuit of FIG. 8 can be implemented, for example, in the FPGA shown in FIG. 5, utilizing the BRAM logic elements to implement FIFOs 801 and 802. In the embodiment of FIG. 8, the first write clock cycle writes a word to N-bit register 821, and the second write clock cycle writes a second N-bit word to FIFO 801 along with the contents of register 821. The third write clock cycle writes a word to N-bit register 822, and the fourth write clock cycle writes a fourth N-bit word to FIFO 802 along with the contents of register 822. Thus, the input data DIN is deserialized. The control logic for the write interface is the same as the control logic in FIG. 6, except for the addition of registers 821-822.

Figure 9:
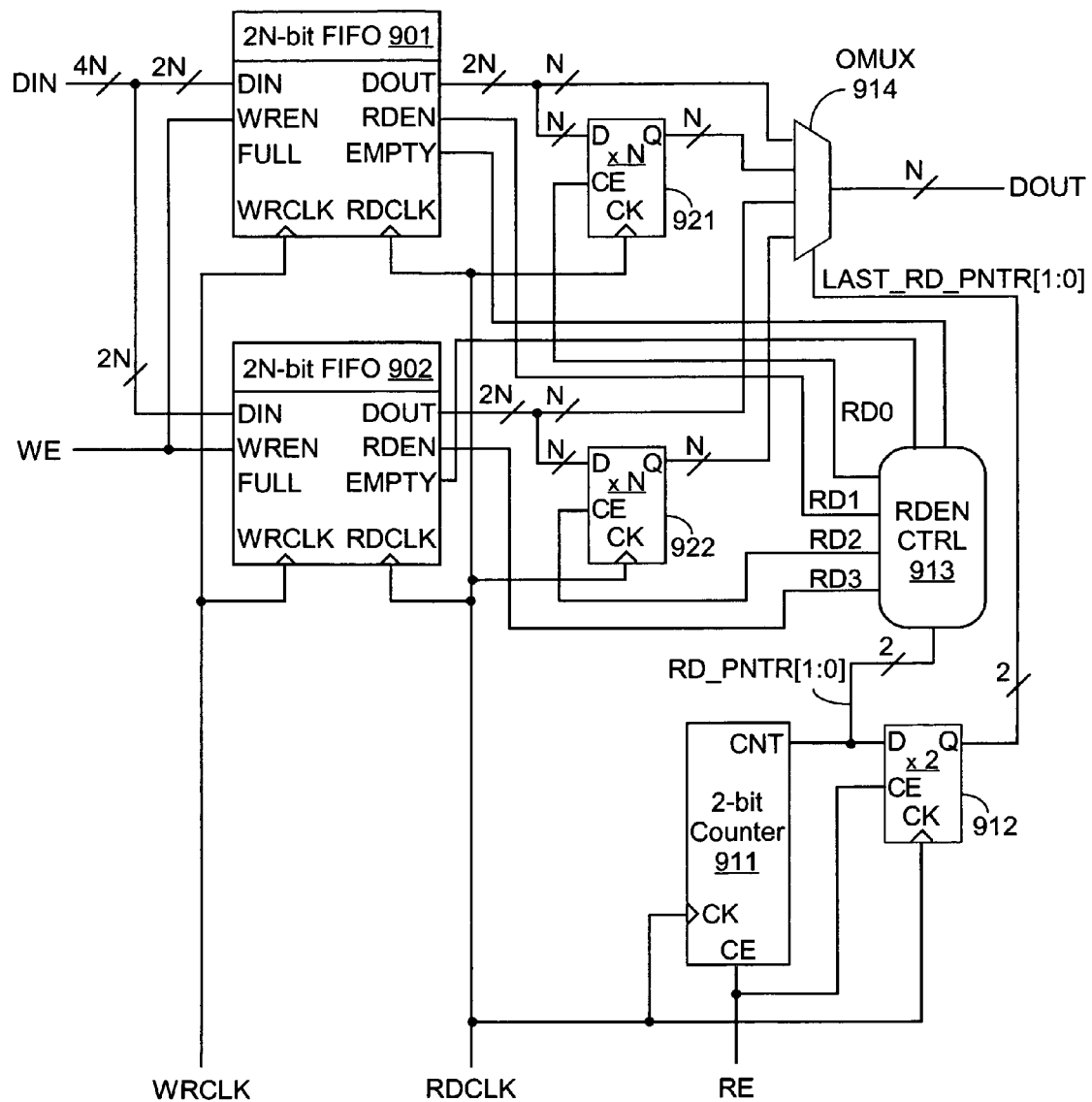
FIG. 9 illustrates a memory circuit implementation suitable for interfacing between a relatively wide write interface and a relatively narrow read interface.

Additionally or alternatively, the technique shown in FIGS. 7 and 8 can be employed on the read interface, using registers to queue N-bit data from the FIFOs, then presenting the data N bits at a time on the output data port DOUT. FIG. 9 illustrates an implementation of one such interface.

FIG. 9 illustrates one implementation of a memory circuit suitable for interfacing between a relatively wide write interface and a relatively narrow read interface, e.g., as shown in FIG. 3. The memory circuit of FIG. 9 can be implemented, for example, in the FPGA shown in FIG. 5, utilizing the BRAM logic elements to implement FIFOs 901-902. In the embodiment of FIG. 9, when read enable signal RE is high and read clock RDCLK goes high, a read operation occurs. Each read of N-bit output data DOUT from the memory circuit triggers a read of the output data DOUT from a selected one of the FIFOs 901-902 and N-bit registers 921-922. A first read cycle reads a word from FIFO 901. A second read cycle reads a word previously read from FIFO 901 and stored in N-bit register 921. A third read cycle reads a word from FIFO 902, and a fourth read cycle reads a word previously read from FIFO 902 and stored in N-bit register 922.

When data is read from the memory circuit, output multiplexer (OMUX) 914 must already be selecting the correct data. Therefore, the previous read pointer LAST_RD_PNTR [1:0] is used to control output multiplexer 914. The previous read pointer LAST_RD_PNTR[1:0] is a registered version (from 2-bit register 912) of the read pointer RD_PNTR[1:0] from 2-bit counter 911. The read pointer RD_PNTR[1:0] is also provided to read enable control circuit 913, which drives one of read enable signals RD0-RD3 high during each read cycle, providing the EMPTY signal from the corresponding FIFO is not asserted.

In some embodiments (not shown), the read registers 921 and 922 are omitted. Rather than storing the read data in these registers, the read data is read directly from output latch at the read terminals of the two FIFOs 901 and 902. In these embodiments, read enable control circuit 913 is adapted to accommodate this approach.

During a write operation, write clock signal WRCLK goes high and write enable signal WE is high. Signal WREN is high for each FIFO, so 2N bits are written to each of FIFOs 901-902 from 4N-bit input data DIN.

Status signals FULL and EMPTY can be used to generate status signals for the memory circuit (circuitry not shown), e.g., by ORing together the FULL signals from both FIFOs to generate a FULL signal for the entire memory circuit, and/or ORing together the EMPTY signals from both FIFOs to generate an EMPTY signal for the entire memory circuit. When this straightforward implementation is used, however, the FULL and EMPTY status signals do not provide completely accurate information on the status of the memory circuit as a whole. A more accurate and only slightly more complicated implementation of the FULL and EMPTY status signals is shown in connection with FIGS. 10-12, below.

Figure 10:
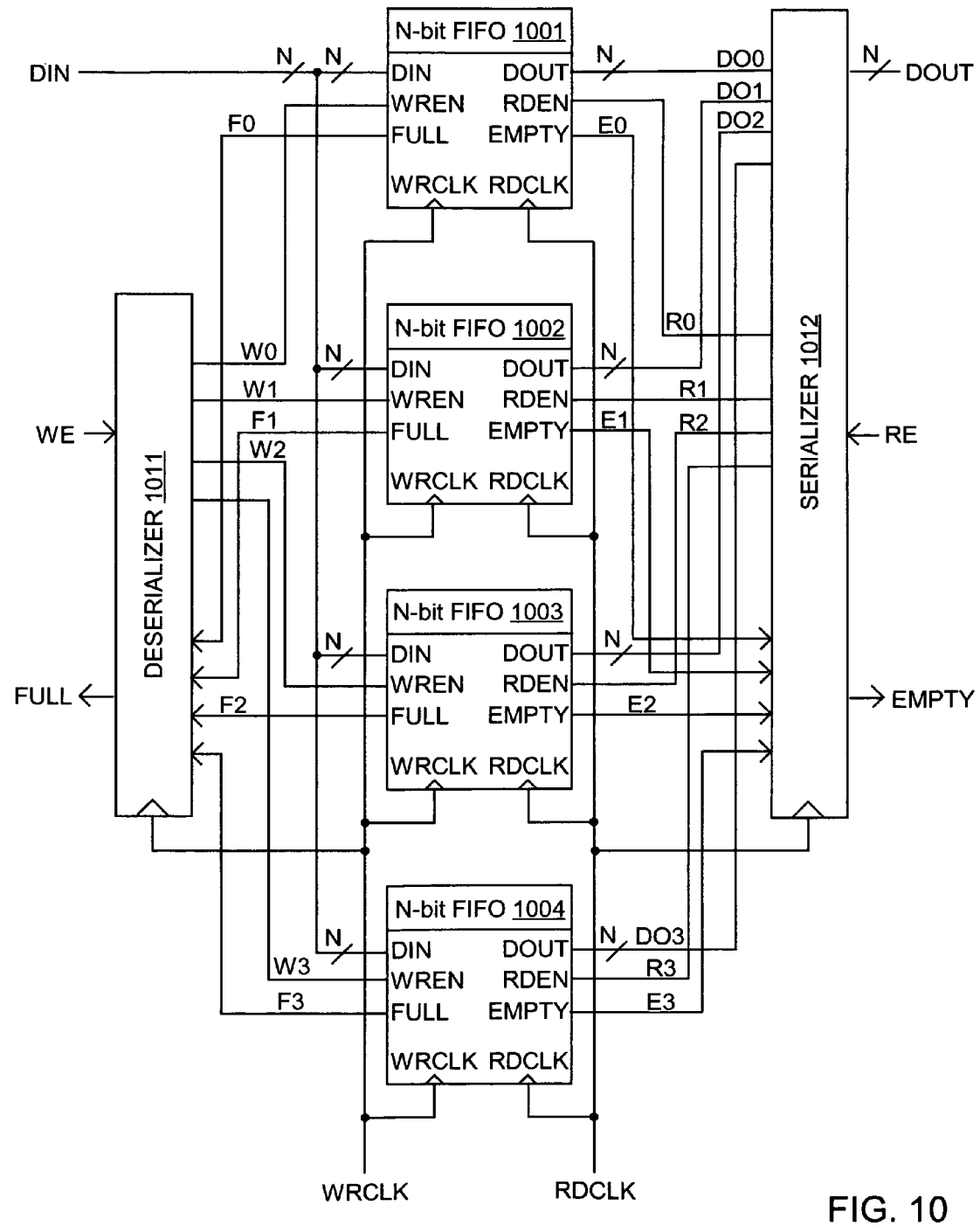
FIG. 10 illustrates a memory circuit implementation with symmetric write and read ports that is suitable for use when write and read clock signals are asynchronous and may have variable or unpredictable frequencies.

FIG. 10 illustrates a memory circuit implementation with symmetric write and read ports that is suitable for use when write and read clock signals are asynchronous and may have variable or unpredictable frequencies. The memory circuit of FIG. 10 is one implementation of the circuit shown in FIG. 2 and can be implemented, for example, in the FPGA shown in FIG. 5, utilizing the BRAM logic elements to implement FIFOs 1001-1004. The memory circuit of FIG. 10 includes four N-bit wide FIFOs 1001-1004, a deserializer 1011, and a serializer 1012, coupled together as shown in FIG. 10.

Figure 11:
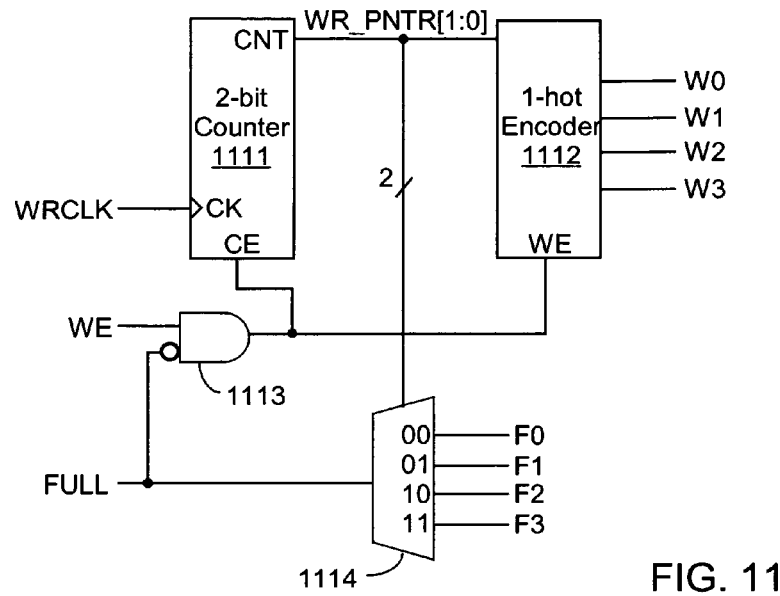
FIG. 11 illustrates a deserializer that can be included in the write control logic of the memory circuit of FIG. 10.

FIG. 11 illustrates a deserializer circuit that can be included in the write control logic of the memory circuit of FIG. 10. The deserializer of FIG. 11 can be implemented, for example, using the programmable logic fabric (e.g., the CLEs) of the FPGA illustrated in FIG. 5. The deserializer includes a 2-bit counter 1111, a one-hot encoder 1112, an AND gate 1113, and a 4-input multiplexer 1114, coupled together as shown in FIG. 11. 2-Bit counter 1111 and one-hot encoder 1112 function to create write pointer WR_PNTR[1:0] and write enable signals W0-W3 in a manner similar to that previously described in connection with FIG. 6. When write pointer WR_PNTR[1:0] is selecting one of FIFOs 1001-1004 (see FIG. 10), the write pointer also controls multiplexer 1114 to select the full signal F0-F3 associated with the selected FIFO as the FULL signal of the memory circuit as a whole. One-hot encoder 1112 drives one of write enable signals W0-W3 high only when the memory circuit is not FULL (signal FULL is low) and writing to the memory circuit is enabled (signal WE is high).

Figure 12:
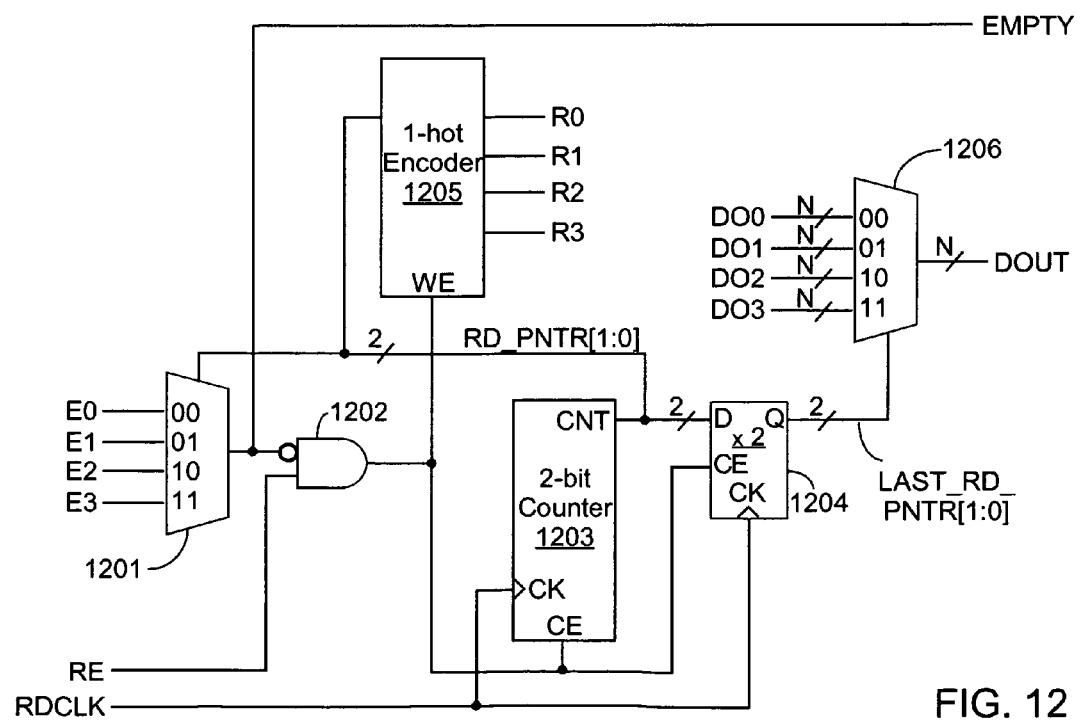
FIG. 12 illustrates a serializer that can be included in the read control logic of the memory circuit of FIG. 10.

FIG. 12 illustrates a serializer circuit that can be included in the read control logic of the memory circuit of FIG. 10. The serializer of FIG. 12 can be implemented, for example, using the programmable logic fabric (e.g., the CLEs) of the FPGA illustrated in FIG. 5. The deserializer includes a 2-bit counter 1203, a 2-bit register 1204, an N-bit output multiplexer 1206, a one-hot encoder 1205, an AND gate 1202, and a 4-input multiplexer 1201, coupled together as shown in FIG. 12.

2-Bit counter 1203 and one-hot encoder 1205 function to create read pointer RD_PNTR[1:0] and read enable signals R0-R3 in a manner similar to that previously described in connection with FIG. 9. When the previous read pointer LAST_RD_PNTR[1:0] is selecting the output DO0-DO3 of one of FIFOs 1001-1004 as output data DOUT, the read pointer RD_PNTR[1:0] controls multiplexer 1201 to select the empty signal E0-E3 associated with the selected FIFO as the EMPTY signal for the memory circuit as a whole. One-hot encoder 1205 drives one of read enable signals R0-R3 high only when the memory circuit is not EMPTY (signal EMPTY is low) and reading from the memory circuit is enabled (signal RE is high).

The FIFO sizes and bus widths illustrated herein were selected for clarity of illustration and understanding, and are purely exemplary in nature. It will be clear to those of skill in the art that the memory circuits of FIGS. 2-12 can easily be adapted to use different numbers of FIFOs and/or FIFOs of different widths and/or depths. It will be apparent to one skilled in the art after reading this specification that the present invention can be practiced within these and other architectural variations.

The design of FIGS. 10-12 can be implemented, for example, in a Virtex®-4 FPGA from Xilinx, Inc. The Virtex-4

FPGA includes RAM blocks that can be programmed to function as FIFOs having input ports, status signals, and output ports as shown in FIG. 10, for example. The Virtex-4 RAM blocks are described in detail in pages 109-161 of the "Virtex-4 User Guide", available from Xilinx, Inc. at http://direct.xilinx.com/bvdocs/userguides/ug070.pdf, which pages are hereby incorporated herein by reference. (A similar document was first published in August of 2004.) The FIFO functionality of the block RAM is described on pages 139-157 of this document.

An HDL implementation of the memory circuit of FIGS. 10-12 follows.

```
--------------------------------------------------------------
-- Module Name:    fifotop - Behavioral
-- Target Device:  Virtex-4
-- Description: This is sample code for a method of
--     concatenating FIFOs in depth.
--
-- Dependencies: Xilinx Unisim Library
--
--------------------------------------------------------------
library IEEE;
use IEEE.STD_LOGIC_1164.ALL;
use IEEE.STD_LOGIC_ARITH.ALL;
use IEEE.STD_LOGIC_UNSIGNED.ALL;
Library UNISIM;
use UNISIM.vcomponents.all;
--Define input and output ports for memory circuit as a whole
entity fifotop is
    Port ( WE : in std_logic;
           DIN : in std_logic_vector(31 downto 0);
           FULL : out std_logic;
           WR_CLK : in std_logic;
           RE : in std_logic;
           DOUT : out std_logic_vector(31 downto 0);
           EMPTY : out std_logic);
end fifotop;
architecture Behavioral of fifotop is
--Define internal signal names
signal almostempty : std_logic_vector(3 downto 0);
signal almostfull : std_logic_vector(3 downto 0);
signal dop : std_logic_vector(4*4-1 downto 0);
signal do : std_logic_vector(32*4-1 downto 0);
signal e : std_logic_vector(3 downto 0);
signal empty_i : std_logic;
signal f : std_logic_vector(3 downto 0);
signal full_i : std_logic;
signal rdcount : std_logic_vector(12*4-1 downto 0);
signal rderr : std_logic_vector(3 downto 0);
signal wrcount : std_logic_vector(12*4-1 downto 0);
signal wrerr : std_logic_vector(3 downto 0);
signal dip : std_logic_vector(4*4-1 downto 0);
signal rdclk : std_logic;
signal rden : std_logic_vector(3 downto 0);
signal rst : std_logic;
signal wrclk : std_logic;
signal wren : std_logic_vector(3 downto 0);
signal wr_pntr : std_logic_vector(1 downto 0) := "00";
signal 1st_rd_pntr : std_logic_vector(1 downto 0) := "11";
signal rd_pntr : std_logic_vector(1 downto 0) := "00";
begin
dip <= "0000000000000000";   --Tie off, unused
rst <= '0';   --Tie off, unused
wrclk <= WR_CLK;
rdclk <= not WR_CLK;
--Write Pointer - points to FIFO to write to
--This code implements counter 1111 & AND gate 1113 of FIG. 11
process (wrclk)
begin
    if (wrclk'event and wrclk='1' and WE='1' and full_i='0') then
        wr_pntr <= wr_pntr + "01" after 100 ps;
    end if;
end process;
--Read Pointer - points to FIFO to read from
--This code implements counter 1203, register 1204, and
--    AND gate 1202 of FIG. 12
--Update CNT when RDCLK goes high, RE is high, & EMPTY is low
process (rdclk)
begin
    if (rdclk'event and rdclk='1' and RE='1' and empty_i='0') then
        1st_rd_pntr <= rd_pntr after 100 ps;
        rdpntr <= rd_pntr + "01" after 100 ps;
    end if;
end process;
--Create the internal wren bus
--This code implements one-hot encoder 1112 of FIG. 11
--One of the WRENs is high when WE is high & FULL is low
process (WE, wr_pntr, full_i)
begin
    if (WE='1' and full_i='0') then
        case (wr_pntr) is
            when "00" => wren(3 downto 0) <= "0001";
            when "01" => wren(3 downto 0) <= "0010";
            when "10" => wren(3 downto 0) <= "0100";
            when "11" => wren(3 downto 0) <= "1000";
                when others => wren(3 downto 0) <= "0000";
        end case;
    else
        wren(3 downto 0) <= "0000";
    end if;
end process;
--Create the internal rden bus
--This code implements one-hot encoder 1205 of FIG. 12
--One of the RDENs is high when RE is high & EMPTY is low
process (RE, rd_pntr, empty_i)
begin
    if (RE='1' and empty_i='0') then
        case (rd_pntr) is
            when "00" => rden(3 downto 0) <= "0001";
            when "01" => rden(3 downto 0) <= "0010";
            when "10" => rden(3 downto 0) <= "0100";
            when "11" => rden(3 downto 0) <= "1000";
                when others => rden(3 downto 0) <= "0000";
        end case;
    else
        rden(3 downto 0) <= "0000";
    end if;
end process;
--Create the output multiplexer
--This code implements the DOUT output MUX 1206 of FIG. 12
process (1st_rd_pntr)
begin
    case (1st_rd_pntr) is
        when "00" => DOUT(31 downto 0) <= do(32*(0+1)-1 downto 32*0);
        when "01" => DOUT(31 downto 0) <= do(32*(1+1)-1 downto 32*1);
        when "10" => DOUT(31 downto 0) <= do(32*(2+1)-1 downto 32*2);
        when "11" => DOUT(31 downto 0) <= do(32*(3+1)-1 downto 32*3);
        when others => DOUT(31 downto 0) <= do(32*(0+1)-1 downto 32*0);
    end case;
end process;
--Internal full (full_i) is connected to addressed FIFO
--This code implements multiplexer 1114 of FIG. 11
process (wr_pntr, f)
begin
    case (wr_pntr) is
        when "00" => full_i <= f(0);
        when "01" => full_i <= f(1);
        when "10" => full_i <= f(2);
        when "11" => full_i <= f(3);
        when others => full_i <= f(0);
    end case;
end process;
--Send FULL signal for memory circuit as a whole to the user
FULL <= full_i;
--Internal empty (empty_i) is connected to addressed FIFO
--This code implements multiplexer 1201 of FIG. 12
process (rd_pntr, e)
begin
    case (rd_pntr) is
        when "00" => empty_i <= e(0);
```

-continued

```
            when "01" => empty_i <= e(1);
            when "10" => empty_i <= e(2);
            when "11" => empty_i <= e(3);
            when others => empty_i <= e(0);
        end case;
    end process;
    --Send EMPTY signal for memory circuit as a whole to the user
    EMPTY <= empty_i;
    fifoloop : for i in 0 to 3 generate
    -------------------------------------------------------------
    -- FIFO 16 primitive instantiation
    -- This code implements the four FIFO memory blocks of FIG. 10
    -------------------------------------------------------------
    fifoinst : fifo16
        GENERIC MAP
            ALMOST_FULL_OFFSET => X"080",      -- Sets almost full
                                                  threshold
            ALMOST_EMPTY_OFFSET => X"080",     -- Sets almost empty
                                                  threshld
            DATA_WIDTH => 36,  -- Sets data width to 4, 9, 18, or 36
            FIRST_WORD_FALL_THROUGH => FALSE -- Sets the FIFO
    FWFT
        )
        PORT MAP (
            ALMOSTEMPTY   => almostempty(i),                  --Not used
            ALMOSTFULL    => almostfull(i),                   --Not used
            DO            => do(32*(i+1)-1 DOWNTO
                             32*i),
            DOP           => dop(4*(i+1)-1 DOWNTO 4*i),       --Not used
            EMPTY         => e(i),
            FULL          => f(i),
            RDCOUNT       => rdcount(12*(i+1)-1 DOWNTO        --Not used
                             12*i),
            RDERR         => rderr(i),                        --Not used
            WRCOUNT       => wrcount(12*(i+1)-1 DOWNTO        --Not used
                             12*i),
            WRERR         => wrerr(i),                        --Not used
            DI            => DIN(31 DOWNTO 0),
            DIP           => dip(4*(i+1)-1 DOWNTO 4*i),       --Not used
            RDCLK         => rdclk,
            RDEN          => rden(i),
            RST           => rst,                             --Not used
            WRCLK         => wrclk,
            WREN          => wren(i)
        );
    end generate;
end Behavioral;
```

Those having skill in the relevant arts of the invention will now perceive various modifications and additions that can be made as a result of the disclosure herein. For example, the above text describes the circuits and methods of the invention in the context of ICs such as programmable logic devices (PLDs). However, the circuits of the invention can also be implemented in other electronic systems, for example, in printed circuit boards including discrete devices.

Further, FIFOs, serializers, deserializers, one-hot encoders, counters, registers, multiplexers, AND gates, RAM blocks, write interfaces, read interfaces, and other components other than those described herein can be used to implement the invention. Active-high signals can be replaced with active-low signals by making straightforward alterations to the circuitry, such as are well known in the art of circuit design. Logical circuits can be replaced by their logical equivalents by appropriately inverting input and output signals, as is also well known.

Moreover, some components are shown directly connected to one another while others are shown connected via intermediate components. In each instance the method of interconnection establishes some desired electrical communication between two or more circuit nodes. Such communication can often be accomplished using a number of circuit configurations, as will be understood by those of skill in the art.

Accordingly, all such modifications and additions are deemed to be within the scope of the invention, which is to be limited only by the appended claims and their equivalents.

What is claimed is:

1. A memory circuit, comprising:
   a write interface;
   wherein the write interface is N-bits wide, and N is greater than 1;
   a read interface;
   a deserializer circuit having an input port and a plurality of output ports, wherein the input port of the deserializer circuit is coupled to the write interface;
   wherein the deserializer circuit further includes a plurality of write enable output terminals;
   a plurality of first-in first-out memories (FIFOs), each FIFO having a write enable input terminal coupled to an associated one of the write enable output terminals of the deserializer circuit, each FIFO further having an N-bit wide data output port coupled to the read interface;
   wherein each FIFO has a data-in port at least N-bits wide, and the data-in ports of the FIFOs are coupled to the N-bit wide write interface such that N bits of data at the N-bit wide write interface are presented at once in parallel to the data-in ports of all of the FIFOs;
   wherein the deserializer is configured to provide respective write enable signals on the output ports to the write enable input ports of the plurality of FIFOs, and for each successive set of N bits on the write interface, the deserializer enables writing of the set of N bits to a different one of the plurality of FIFOs; and
   wherein each FIFO provides a respective full status signal in response to the FIFO being full and a respective empty status signal in response to the FIFO being empty.

2. The memory circuit of claim 1, wherein the write interface and the read interface are of different widths.

3. The memory circuit of claim 1, wherein the memory circuit comprises at least a portion of a programmable logic device (PLD), and the FIFOs comprise programmable random access memory (RAM) blocks in the PLD programmed to function as first-in first-out memories.

4. The memory circuit of claim 1, wherein:
   each of the FIFOs further comprises a write clock input terminal, and
   the deserializer circuit comprises:
      a counter having a clock input terminal coupled to the write clock input terminal of each of the FIFOs, and further having a multi-bit output port; and
      a one-hot encoder having a multi-bit input port coupled to the multi-bit output port of the counter, and coupled to the plurality of write enable output terminals.

5. The memory circuit of claim 4, wherein the deserializer circuit further comprises:
   a register having a clock-enable terminal coupled to one of the write enable output terminals and N data-out terminals coupled to the data-in port of one of the FIFOs.

6. The memory circuit of claim 1, further comprising:
   a serializer circuit coupled between the output port of each of the FIFOs and the read interface, wherein the output port of each of the FIFOs is coupled to an input port of the serializer circuit, and wherein an output port of the serializer circuit is coupled to the read interface.

7. The memory circuit of claim 6, wherein each of the FIFOs comprises a read enable input terminal and a read clock input terminal, and wherein the serializer circuit comprises:
   a multiplexer coupled between the output ports of the FIFOs and the read interface, the multiplexer having a plurality of data input ports each coupled to the output port of one of the FIFOs, an output port coupled to the read interface, and a plurality of select input terminals;

a counter having a clock input terminal coupled to the read clock input terminal of each of the FIFOs, and further having a multi-bit output port coupled to the select input terminals of the multiplexer; and a one-hot encoder having a multi-bit input port coupled to the multi-bit output port of the counter, and further having a plurality of output terminals, each of the output terminals of the one-hot encoder being coupled to the read enable input terminal of one of the FIFOs.

8. The memory circuit of claim 7, wherein the serializer circuit further comprises:

a register coupled between the multi-bit output port of the counter and the select input terminals of the multiplexer.

9. A memory circuit, comprising:

a write interface;

wherein the write interface is (M×N) bits wide, and M and N are at least 2;

a read interface;

a serializer circuit having an output port and a plurality of input ports, wherein the output port of the serializer circuit is coupled to the read interface;

wherein the serializer circuit further includes a plurality of read enable output terminals;

a plurality of first-in first-out memories (FIFOs), each FIFO having an input port at least N bits wide coupled to the write interface, each FIFO further having an output port at least N bits wide coupled to an associated input port of the serializer circuit;

wherein there are M FIFOs, M×N bits data from the write interface are written in parallel to the M FIFOs, each FIFO has a read enable input terminal, and data from the output ports of the FIFOs are provided at once in parallel to the input port of the serializer circuit;

wherein the serializer is configured to provide respective read enable signals to the read enable input terminals of the M FIFOs and provide N bits at a time of (M×N bits) from the M FIFOs to the read interface at the output port of the serializer; and wherein each FIFO provides a respective full status signal in response to the FIFO being full and a respective empty status signal in response to the FIFO being empty.

10. The memory circuit of claim 9, wherein the memory circuit comprises at least a portion of a programmable logic device (PLD), and the FIFOs comprise programmable random access memory (RAM) blocks in the PLD programmed to function as first-in first-out memories.

11. The memory circuit of claim 9, wherein each of the FIFOs comprises a read clock input terminal, and wherein the serializer circuit comprises:

a multiplexer coupled between the output ports of the FIFOs and the read interface, the multiplexer having a plurality of data input ports each coupled to the output port of one of the FIFOs, an output port coupled to the read interface, and a plurality of select input terminals;

a counter having a clock input terminal coupled to the read clock input terminal of each of the FIFOs, and further having a multi-bit output port coupled to the select input terminals of the multiplexer; and a one-hot encoder having a multi-bit input port coupled to the multi-bit output port of the counter, and further having a plurality of output terminals, each of the output terminals of the one-hot encoder being coupled to the read enable input terminal of one of the FIFOs.

12. The memory circuit of claim 11, wherein the serializer circuit further comprises:

a register coupled between the multi-bit output port of the counter and the select input terminals of the multiplexer.

13. A memory circuit, comprising:

a first-in first-out memory (FIFO) having an (N times M)-bit data input port, a multi-bit data output port, a write clock input terminal, and a write enable input terminal, wherein N and M are integers greater than 1; and a deserializer circuit having an N-bit data input port, M N-bit data output ports, a write clock input terminal coupled to the write clock input terminal of the FIFO, and a write enable output terminal coupled to the write enable input terminal of the FIFO;

wherein the deserializer circuit includes, a plurality of registers, each of the registers being coupled to provide N bits of data to the data input port of the FIFO, a counter having a clock input terminal coupled to the write clock input terminal of the deserializer circuit, and further having a multi-bit output port, and a one-hot encoder having a multi-bit input port coupled to the multi-bit output port of the counter, and further having M output terminals, (M minus 1) of the M output terminals being coupled to corresponding ones of the registers for enabling storing of respective N bits of input data in each of the corresponding registers, and one of the M output terminals being coupled to the write enable output terminal of the deserializer circuit for enabling storing of (N times M) bits of data from the (M minus 1) registers and the input port of the deserializer circuit.

14. The memory circuit of claim 13, wherein the plurality of registers comprises exactly (M minus 1) registers.

15. The memory circuit of claim 13, wherein a data input port of each of the registers is coupled to the N-bit data input port of the deserializer circuit.

16. The memory circuit of claim 13, wherein the memory circuit comprises at least a portion of a programmable logic device (PLD), and the FIFO comprises a programmable random access memory (RAM) block in the PLD programmed to function as a first-in first-out memory.

* * * * *